(12) United States Patent
Baun et al.

(10) Patent No.: US 9,903,342 B2
(45) Date of Patent: Feb. 27, 2018

(54) ELECTRICAL SUPPLY INTO WIND TURBINE HUB

(71) Applicant: Vestas Wind Systems A/S, Aarhus N. (DK)

(72) Inventors: Torben Friis Baun, Skodstrup (DK); Jesper Lykkegaard Neubauer, Hornslet (DK)

(73) Assignee: Vestas Wind Systems A/S, Aarhus N. (DK)

( * ) Notice: Subject to any disclaimer, the term of this patent is extended or adjusted under 35 U.S.C. 154(b) by 377 days.

(21) Appl. No.: 14/410,933

(22) PCT Filed: Jun. 20, 2013

(86) PCT No.: PCT/DK2013/050204
§ 371 (c)(1),
(2) Date: Dec. 23, 2014

(87) PCT Pub. No.: WO2014/005588
PCT Pub. Date: Jan. 9, 2014

(65) Prior Publication Data
US 2015/0204309 A1   Jul. 23, 2015

Related U.S. Application Data

(60) Provisional application No. 61/666,944, filed on Jul. 2, 2012.

(30) Foreign Application Priority Data

Jul. 2, 2012   (DK) .................. 2012 70390

(51) Int. Cl.
*F03D 1/06*   (2006.01)
*F03D 7/04*   (2006.01)
(Continued)

(52) U.S. Cl.
CPC ........... *F03D 7/042* (2013.01); *F03D 1/0675* (2013.01); *F03D 1/0691* (2013.01); *F03D 9/25* (2016.05);
(Continued)

(58) Field of Classification Search
CPC .... F03D 1/0666; F03D 1/0675; F03D 1/0691; F03D 7/042; F03D 9/002; F03D 9/003;
(Continued)

(56) References Cited

U.S. PATENT DOCUMENTS 7,218,012 B1   5/2007   Edenfeld
7,547,212 B2*  6/2009   Krumme ................. H01F 38/18
                                                      439/11

(Continued)

FOREIGN PATENT DOCUMENTS

DE   19754809 C1   2/1999
DE   20020232 U1   1/2002
(Continued)

OTHER PUBLICATIONS

Machine translation of DE 19754809 C1 (Feb. 1999) from Espacenet.*

(Continued)

*Primary Examiner* — Jason Shanske
*Assistant Examiner* — Christopher R Legendre
(74) *Attorney, Agent, or Firm* — Wood Herron & Evans LLP

(57) ABSTRACT

The invention provides a wind turbine including a nacelle, a rotor having at least one blade attached to a hub, and an electrical supply structure for supplying electrical power from the nacelle to the rotor. The rotor is rotatably connected to the nacelle about an axis of rotation. The supply structure comprises a switch which has a connected mode in which the nacelle and the rotor are electrically connected, and a (Continued)

disconnected mode in which the nacelle and the rotor are electrically disconnected. Furthermore, the switch is adapted to change from the disconnected mode to the connected mode when the rotor does not rotate.

20 Claims, 3 Drawing Sheets

(51) Int. Cl.
| | | |
|---|---|---|
| H01R 39/10 | (2006.01) | |
| H01R 39/26 | (2006.01) | |
| H01R 39/42 | (2006.01) | |
| F03D 80/00 | (2016.01) | |
| F03D 80/40 | (2016.01) | |
| F03D 80/80 | (2016.01) | |
| F03D 9/25 | (2016.01) | |

(52) U.S. Cl.
CPC ............. *F03D 9/255* (2017.02); *F03D 80/00* (2016.05); *F03D 80/40* (2016.05); *F03D 80/82* (2016.05); *H01R 39/10* (2013.01); *H01R 39/26* (2013.01); *H01R 39/42* (2013.01); *F05B 2260/40* (2013.01); *F05B 2260/76* (2013.01); *F05B 2270/602* (2013.01); *Y02E 10/721* (2013.01); *Y02E 10/726* (2013.01)

(58) Field of Classification Search
CPC .......... F03D 80/00; F03D 80/80; F03D 80/82; F03D 80/85; F03D 80/88; Y02E 10/721; Y02E 10/726; B60R 16/027
See application file for complete search history.

(56) References Cited

U.S. PATENT DOCUMENTS

| | | | | |
|---|---|---|---|---|
| 8,154,141 | B2* | 4/2012 | Andresen | F03D 7/0224 |
| | | | | 290/44 |
| 8,987,930 | B2* | 3/2015 | Matzen | F03D 7/0284 |
| | | | | 290/44 |
| 9,415,875 | B2* | 8/2016 | Stiesdal | B64D 15/12 |
| 9,422,919 | B2* | 8/2016 | Bertolotti | F03D 7/0224 |
| 2009/0302608 | A1* | 12/2009 | Andresen | F03D 7/0224 |
| | | | | 290/44 |
| 2010/0029399 | A1 | 2/2010 | Gopfert et al. | |
| 2011/0280723 | A1* | 11/2011 | Libergren | F03D 80/40 |
| | | | | 416/1 |
| 2015/0204309 | A1* | 7/2015 | Baun | H01R 39/42 |
| | | | | 415/30 |
| 2016/0258424 | A1* | 9/2016 | Nielsen | F03D 80/40 |

FOREIGN PATENT DOCUMENTS

| | | | | |
|---|---|---|---|---|
| DE | 202010016941 U1 | 3/2012 | | |
| WO | 2004098018 A1 | 11/2004 | | |
| WO | 2011110429 A2 | 9/2011 | | |
| WO | WO 2011127997 A1 * | 10/2011 | ............. | B64D 15/12 |
| WO | WO 2012089698 A2 * | 7/2012 | ............. | F03D 7/0284 |

OTHER PUBLICATIONS

Danish Patent and Trademark Office, Search Report and Written Opinion issued in corresponding Danish Application No. PA 2012 70390, dated Feb. 15, 2013, 4 pages.
International Searching Authority, International Search Report issued in corresponding International Application No. PCT/DK2013/050204, dated Aug. 30, 2013, 9 pages.

* cited by examiner

ELECTRICAL SUPPLY INTO WIND TURBINE HUB

FIELD OF THE INVENTION

The present invention relates to a wind turbine comprising an electrical supply structure for supplying electrical power from the nacelle to the rotor.

BACKGROUND OF THE INVENTION

In the wind power industry there is a tendency to produce wind turbines of increasing size, whereby the size of the individual parts of the wind turbines also increase. Traditionally, electrical power is transferred from the nacelle to the rotor by use of a slip ring as the rotor is rotatably connected to the nacelle. Thus, the slip ring can be used to transfer electrical power from the stationary nacelle to the rotating rotor. Due to the increasing size of the wind turbine, the slip ring needs to be of a considerable size.

Furthermore, the slip ring may be exposed to heavy wear and may thus need regular maintenance or even replacement. Moreover, the slip ring may not always provide sufficiently good contact for transfer of high power current.

DESCRIPTION OF THE INVENTION

It is an object of embodiments of the invention to provide a wind turbine having an improved electrical supply structure for supplying electrical power from the nacelle to the rotor.

According to a first aspect, the invention provides a wind turbine comprising a nacelle, a rotor comprising at least one blade attached to a hub, the rotor being rotatably connected to the nacelle about an axis of rotation, and an electrical supply structure for supplying electrical power from the nacelle to the rotor, wherein the supply structure comprises a switch having a connected mode in which the nacelle and the rotor are electrically connected, and a disconnected mode in which the nacelle and the rotor are electrically disconnected, and wherein the switch is adapted to change from the disconnected mode to the connected mode when the rotor does not rotate.

In the present context the term 'wind turbine' should be interpreted to mean an apparatus which is capable of transforming energy of the wind into electrical energy, preferably to be supplied to a power grid. At least one wind turbine blade extracts the energy from the wind, thereby causing a rotor to rotate. The rotational movements of the rotor are transferred to a generator, either directly via a stator part and a rotor part, or via a drive train, e.g. including a main shaft, a gear system and an input shaft for the generator.

The rotor comprises at least one wind turbine blade attached to a hub. The hub rotates when the at least one wind turbine blade extracts energy from the wind. In the case that the wind turbine is of a kind comprising a drive train for transferring the rotational movements of the rotor to the generator, the hub may advantageously be connected to a main shaft in such a manner that rotational movements of the hub are transferred to rotational movements of the main shaft. In the hub of the present invention, the main shaft may be connected to the hub via a main shaft flange on the hub and a corresponding flange on the main shaft. Similarly, the at least one blade may be connected to the hub via a blade flange and a corresponding flange on the wind turbine blade, preferably via a pitch bearing.

The rotor is rotatably connected to a nacelle about an axis of rotation. The nacelle may house components and systems necessary for converting mechanical energy into electricity. The component may range from heavy duty generators, gearboxes, brakes, and transformers to small electronic components.

By providing a supply structure with a switch for connection and disconnection of the electrical connection between the nacelle and the rotor, the wear of the supply structure for supplying electrical power from the nacelle to the rotor can be decreased, as it is possible to establish the electrical connection only when needed.

Furthermore, the wear may be lowered even more, as it is possible to break off the electrical contact when electrical power is not needed in the rotor.

In the present context the term 'supplying electrical power from the nacelle to the rotor' should be interpreted to mean that electrical power is supplied from the nacelle to the rotor or an element comprised in the rotor, or at least follows the rotation of the rotor, such as a blade, the hub, etc.

The wind turbine may comprise a rotation sensor adapted to detect when the rotor does not rotate. In one embodiment, the rotation sensor forms part of the switch. The sensor may form part of the generator or simply be constituted by the generator, i.e. when the wind turbine does not produce electrical energy, the rotor may be considered "not rotating".

As it may not be necessary to establish the electrical connection from the nacelle to the rotor each time the rotor does not rotate, the changing from the disconnected mode to the connected mode may be conditioned on a need for electrical power in the rotor, i.e. the wind turbine may be adapted to detect a need for electrical power in the rotor and to change from the disconnected mode to the connected mode based on a detected need.

The need for power in the rotor may as an example be a need for power for de-icing of the at least one blade, a need for power for heating the hub, a need for power for lighting in the hub, a need for power for maintenance needs, etc. The power may also be used for other purposes.

The wind turbine may comprise a detection structure to detect the need for power. The detections structure may specifically communicate with the de-icing structure to change to the connected mode when the de-icing structure is turned on.

The change of the mode of the switch may be controlled by a control structure, e.g. by an electronic processor. The control structure may receive input from the rotation sensor and from one or more power need sensors. The power need sensors may e.g. include temperature sensors, light sensors, etc. Furthermore, the change of mode may be initiated by manual interaction.

Thus, the change from the disconnected mode to the connected mode may be automatically performed e.g. based on a signal which indicates that the rotor does not rotate or based on a signal which both indicates that the rotor does not rotate and indicates that there is a power need. It should be understood, that other parameters may also need to be fulfilled before changing from the disconnected mode.

In an alternative embodiment the change from the disconnected mode to the connected mode is performed manually, or at least by manual interaction.

In order to establish an electrical connection between the nacelle and the rotor, the switch may comprise a delivering contact face and a receiving contact face. The receiving contact face may follow the rotation of the rotor such that the contact faces become rotatably movable relative to each other. Thus, in the disconnected mode, the receiving contact face may rotate with the rotor. And when the rotor does not rotate, the receiving contact face does also not rotate, whereby the switch may change from the disconnected mode to the connected mode.

The contact faces may be movable relative to each other in a contact switching direction, whereby the faces are brought into or out of contact. In one embodiment, only one of the faces is movable. As an example, this may be achieved by attaching the receiving contact face rigidly to the rotor and by attaching the delivering contact face movably to the nacelle. In another embodiment, both of the contacting faces may be movably attached in the contact switching direction.

In one embodiment, the contact switching direction is radially outwardly from the axis of rotation, whereas the contact switching direction in another embodiment is axially along the axis of rotation. It should however be understood, that other directions may also be applicable depending e.g. on the size and shape of the contacting faces, and/or the location of the contact faces.

To be able to move the contact faces relative to each other, at least one of the contact faces may be movable in the contact switching direction by a power driven actuator or a spring. I.e. at least one of the contact faces may be moved e.g. by a linear actuator, a solenoid actuator, a piezo actuator, or by the release of a spring, whereby the rotor and the nacelle may be electrically connected.

At least one of the contact faces may be a ring face forming a ring shaped element extending circumferentially about the axis of rotation. Thereby it may be achieved that the nacelle and the rotor may be electrically connected at an arbitrary position of the at least one blade, as the other contact face may be connected along the entire circumferential of the ring face. As an example, the receiving face may form a ring face extending circumferentially about the axis of rotation. When the rotor does not rotate, the delivering face which may be of a smaller size, and receiving face may be brought into contact with each other.

The ring face may be located in or at the hub. As an alternative the ring face may be located in the nacelle, e.g. circumferentially around the main axis. Thus, the ring face may be arranged at the main shaft, e.g. in combination with rotary unions, such as hydraulic unions. Furthermore, the ring face may be arranged in combination with slip rings arranged e.g. for lower power needs.

In one embodiment, the ring face faces radially outwardly from the axis of rotation, whereby the delivering face and the receiving face may be brought into contact with each other by moving at least one of the faces in a contact switching direction being radially outwardly from the axis of rotation, e.g. by radial expansion or contraction of one of the contact faces relative to the other.

In an alternative embodiment, the ring face faces axially along the axis of rotation, whereby the delivering face and the receiving face may be brought into contact with each other by moving at least one of the faces in a contact switching direction being axially along the axis of rotation.

At least one of the contact faces may form at least one section of a circle about the axis of rotation. The at least one section of a circle may be adapted for contact with the ring face mentioned above. However, as an alternative hereto, the at least one section may be adapted for contact with another contact face which does also not extend along the full circumference of the axis of rotation.

In one embodiment, the number of switches is equal to the number of wind turbine blades. It should however be understood, that fewer, such as only one switch, may be needed. The number of receiving contact faces and delivering contact faces need not be equal. The number of switches may also be equal to the number of phases, zero, and ground connectors. Typically, one to three phases and one zero and one ground connector, i.e. a total of three to five switches.

In order to facilitate establishing of the electrical connection between the contact faces, at least one of the contact faces may form a track for the other face to facilitate guided relative movement. As an example, one of the contact faces may have en funnel like shape, thereby providing guidance for the other one of the contact faces.

To facilitate electrical connection of the contact faces, the contact faces may form matching surface imprints. I.e. the shape of one of the contact faces may match the shape of the other contact face. As an example, the contact faces may both be wave shaped, so that the crests of one of the contact faces matches the troughs of the other contact face and vice versa. In another embodiment, one or more indentations formed at one of the contact faces may match one or more protrusions form at the other one of the contact faces. In a further alternative, one of the contact faces may have a fork like shape with teeth which fit into tracks formed in the other contact face. A number of other matching surface imprints may also be applicable.

By shaping the contact faces so that they form matching surface imprints, one of the contact faces may at the same time provide guidance for the other one of the contact faces, thereby facilitating establishment of the electrical connection between the contact faces.

In order to ensure that the rotor is stopped so that the switch can be connected and thereby establish an electrical connection between the nacelle and the rotor, the wind turbine may comprise a control unit responsible for stopping rotation of the rotor at the requested position. The control unit may control braking of the rotor based on, e.g. information on the position of the rotor, and thus the position of the switch, the rotational speed of the rotor, and/or the deceleration of the rotor, thereby allowing for an automatic breaking of the rotor.

To limit the requirement of exact positioning of the contact faces relative to each other, when stopping rotation of the rotor before changing from the disconnected mode to the connected mode, it may be an advantage if the contact faces are of different size. Thus, the smaller one of the contact faces may be brought into contact with the larger one of the connecting faces over a large area, thereby limiting the positioning requirement.

When the rotor does not rotate a sensor may check whether the switch is ready for connection, e.g. by checking that the position of the delivering contact face and the receiving contact face relative to each other is within a predetermined acceptance range. If this can be verified, the switch may change from the disconnected mode to the connected mode.

The electrical supply structure may be adapted for supply of power in the range of 10-200 kW. Especially, the power need in connection with de-icing of the at least one wind turbine blade may require a high power supply, whereas e.g. lighting need and need for power in relation to maintenance e.g. in the hub may be lower.

The switch may be adapted to change from the connected mode to the disconnected mode based on detection of a predetermined rotational speed of the rotor. I.e. when the rotor starts to rotate after a stand still period, the switch may automatically change from the connected mode to the disconnected mode at a predetermined rotational speed. This may also provide a safety regulation for the supply structure, as switching from the connected mode may take place automatically. However, it should be understood, that the change from the connected mode to the disconnected mode may also be initiated manually, or automatically by use of other signals, such as a signal indicating that there is no longer a power need in the rotor or in an element comprised in the rotor, e.g. in the hub or in the at least one blade.

BRIEF DESCRIPTION OF THE DRAWINGS

Embodiments of the invention will now be further described with reference to the drawings, in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
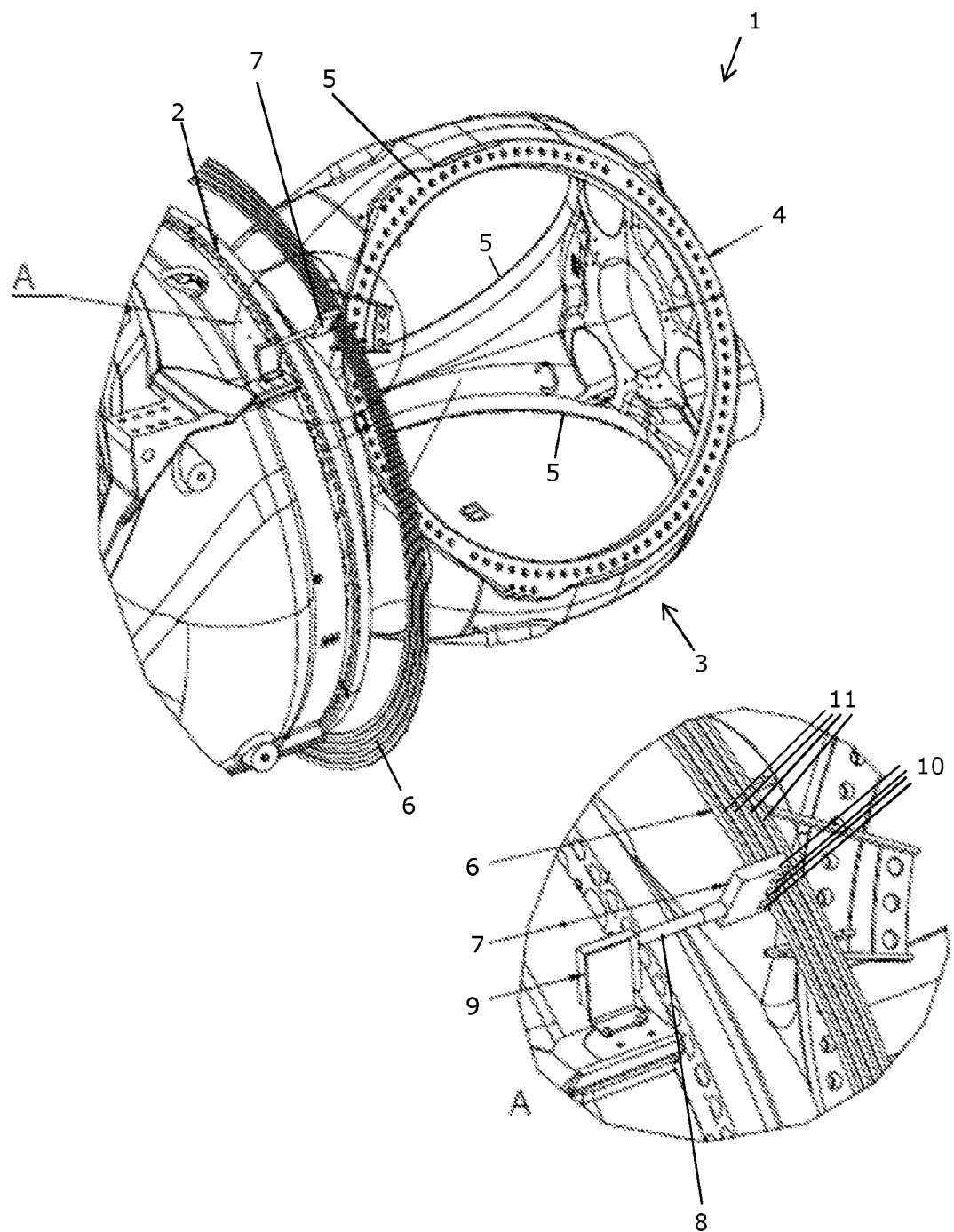
FIG. 1 illustrates parts of an embodiment of the invention, in which one of the contact faces is a ring face.

FIG. 1 illustrates parts of a wind turbine 1. The wind turbine 1 (partly illustrated) comprises a nacelle 2, a rotor 3 comprising three blades (not shown) attached to a hub 4. The rotor 3 is rotatably connected to the nacelle 2 about an axis of rotation (not shown). The three blades are attached to each their blade flange 5.

The wind turbine further comprises an electrical supply structure for supplying electrical power from the nacelle 2 to the rotor 3. The supply structure comprises a switch 6, 7 having a connected mode in which the nacelle 2 and the rotor 3 are electrically connected, and a disconnected mode in which the nacelle 2 and the rotor 3 are electrically disconnected.

The switch 6, 7 is adapted to change from the disconnected mode to the connected mode when the rotor 3 does not rotate.

By providing the supply structure with a switch 6, 7 for connection and disconnection of the electrical connection between the nacelle 2 and the rotor 3, the wear of the supply structure for supplying electrical power from the nacelle to the rotor can be decreased, as it is possible to establish the electrical connection only when needed.

As illustrated in FIG. 1, the switch 6, 7 comprises a delivering contact face 7 and a receiving contact face 6. The receiving contact face 6 follows the rotation of the rotor 3 such that, in the disconnected mode, the receiving contact face 6 rotates with the rotor, as the receiving contact face 6 is rigidly attached to the hub 4. When the rotor 3 does not rotate, the receiving contact face also does not rotate, thereby enabling a change from the disconnected mode to the connected mode of the switch 6, 7.

The contact faces 6, 7 are movable relative to each other in a contact switching direction, whereby the faces can be brought into or out of contact with each other. In the illustrated embodiment, only the delivering contact face 7 is movable. This is achieved by attaching the receiving contact face 6 rigidly to the hub 4 and by attaching the delivering contact face 7 movably to the nacelle 2. The contact switching direction is axially along the axis of rotation, as the contact faces 6, 7 are brought into and out of contact with each other by moving the delivering contact face along the axis of rotation.

The delivering contact face 7 is movable in the contact switching direction by a power driven linear actuator 8. The actuator 8 is attached to the nacelle 2 by use of an angle bracket 9.

The receiving contact face 6 is a ring face forming a ring shaped element extending circumferentially about the axis of rotation. Thereby it is achieved that the nacelle 2 and the rotor 3 can be electrically connected at an arbitrary position of the rotor 3 and thus the at least one blade, as the delivering contact face 7 can be connected along the entire circumferential of the ring face 6. The ring face 6 is located at the hub 4.

The ring face 6 faces axially along the axis of rotation, whereby the delivering contact face 7 and the receiving contact face 6 can be brought into contact with each other by moving the delivering contact face 7 in the contact switching direction being axially along the axis of rotation by radial expansion of the linear actuator 8.

To facilitate electrical connection of the contact faces 6, 7, the contact faces form matching surface imprints. I.e. the shape of the delivering contact face 7 matches the shape of the receiving contact face 6. In the illustrated embodiment, this is achieved by a delivering contact face 7 having a fork like shape with teeth 10 which fit into tracks 11 formed in the receiving contact face 6.

By shaping the contact faces 6, 7 so that they form matching surface imprints, the receiving contact face 6 at the same time provides guidance for the delivering contact face 7 as the teeth 10 fit into the tracks 11, thereby facilitating establishment of the electrical connection between the contact faces 6, 7.

To limit the requirement of exact positioning of the contact faces 6, 7 relative to each other, when stopping rotation of the rotor 3 before changing from the disconnected mode to the connected mode, the contact faces are advantageously made so that they are of different size. Thus, the smaller one of the contact faces, i.e. the delivering contact face 7, can be brought into contact with the larger one of the connecting faces, i.e. the receiving contact face 6, over a larger area, thereby limiting the positioning requirement. In the illustrated embodiment, the delivering contact face 7 can be brought into contact with the receiving contact face 6 at an arbitrary position due to the ring shape hereof.

Figure 2:
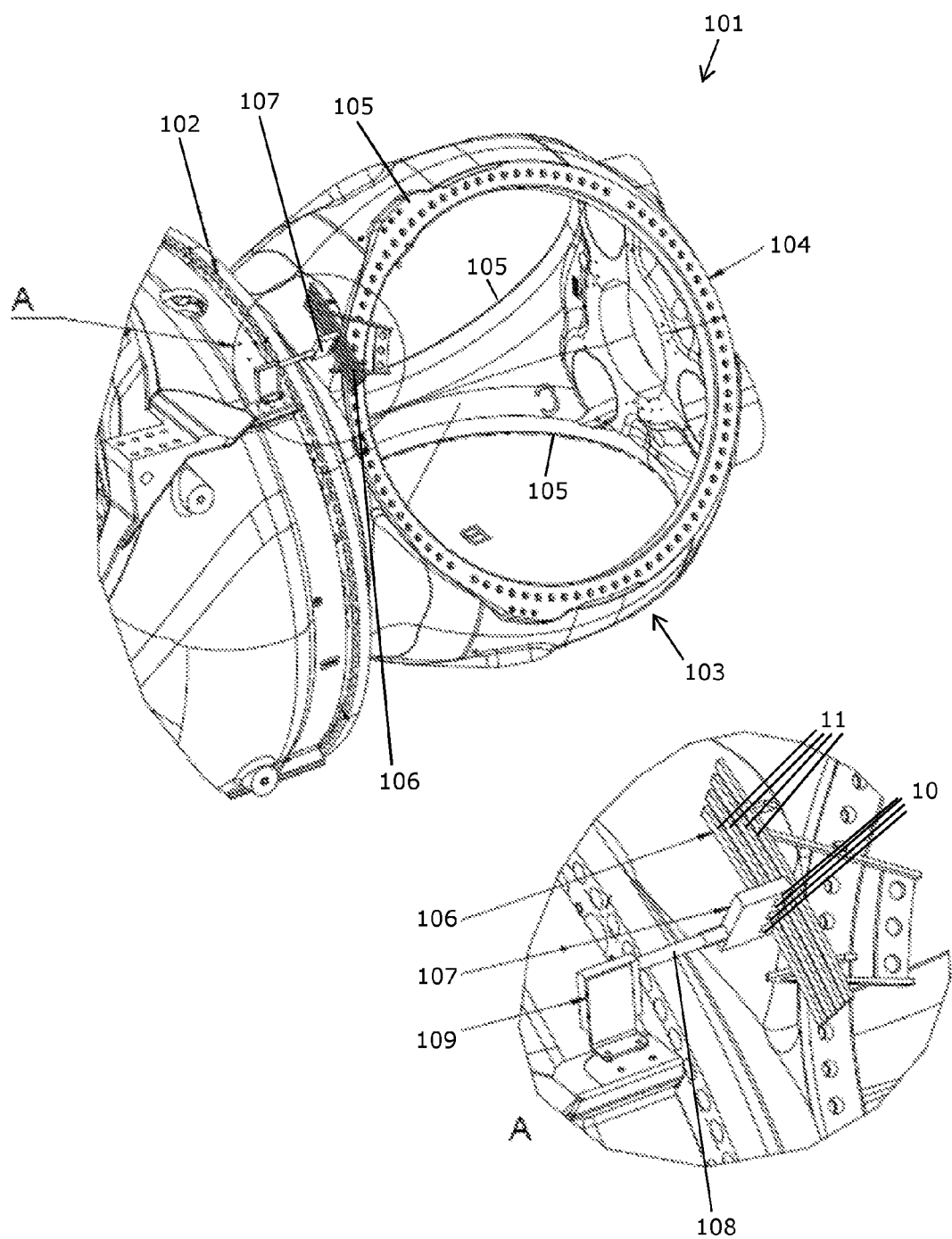
FIG. 2 illustrates parts of an alternative embodiment of the invention, in which one of the contact faces forms at least one segment of a circle.

FIG. 2 illustrates parts of an alternative embodiment of the invention. The wind turbine 101 (partly illustrated) comprises a nacelle 102, a rotor 103 comprising three blades (not shown) attached to a hub 104. The rotor 103 is rotatably connected to the nacelle 102 about an axis of rotation (not shown). The three blades are attached to each their blade flange 105.

The wind turbine 101 further comprises an electrical supply structure for supplying electrical power from the nacelle 102 to the rotor 103. The supply structure comprises a switch 106, 107 having a connected mode in which the nacelle 102 and the rotor 103 are electrically connected, and a disconnected mode in which the nacelle 102 and the rotor 103 are electrically disconnected.

The switch 106, 107 is adapted to change from the disconnected mode to the connected mode when the rotor 103 does not rotate. Thus, the embodiment of FIG. 2 is similar to the wind turbine 1 illustrated in FIG. 1.

However, the receiving contact face 106 forms a section of a circle about the axis of rotation. The section of a circle may be adapted for contact with the delivering contact face 107 being identical to the delivering contact face 7 of the embodiment of FIG. 1.

As the contact faces 106, 107 are of different size, the smaller one of the contact faces, i.e. the delivering contact face 107, can be brought into contact with the larger one of the connecting faces, i.e. the receiving contact face 106, over a larger area, thereby limiting the positioning requirement of the delivering contact face 107, and thus the rotor 103 when stopping the rotor before changing the from the disconnected mode to the connected mode.

Figure 3:
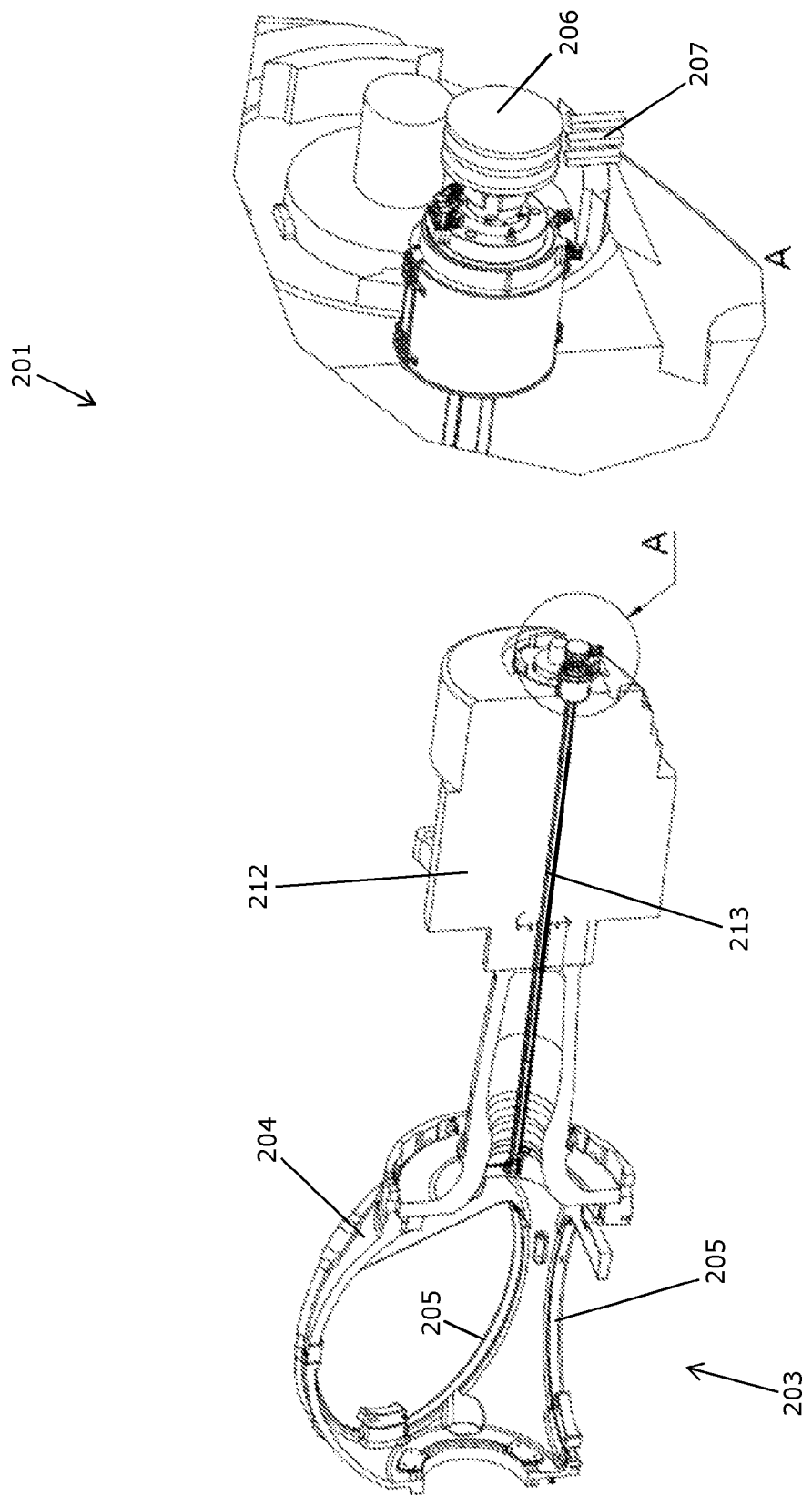
FIG. 3 illustrates parts of a third embodiment of the invention, in which both of the contact faces are located in the nacelle.

FIG. 3 is a cross-section through parts of a further alternative embodiment of the invention. The wind turbine 201 (partly illustrated) comprises a nacelle (not shown), a rotor 203 comprising three blades (not shown) attached to a hub 204. The rotor 203 is rotatably connected to the nacelle about an axis of rotation (not shown). The three blades are attached to each their blade flange 205.

The wind turbine 201 further comprises an electrical supply structure for supplying electrical power from the nacelle to the rotor 203. The supply structure comprises a switch 206, 207 having a connected mode in which the nacelle and the rotor 203 are electrically connected, and a disconnected mode in which the nacelle and the rotor 203 are electrically disconnected.

The switch 206, 207 is adapted to change from disconnected mode to the connected mode when the rotor 203 does not rotate. The switch 206, 207 comprises a delivering contact face 207 and a receiving contact face 206. In the present embodiment, both the receiving contact face 206 and the delivering contact face 207 are located in the nacelle adjacent to the gear house 212. The receiving contact face 206 follows the rotation of the rotor 203, as the receiving contact face 206 is formed as slip ring being attached to the main shaft which forms part of the rotor, such that, in the disconnected mode, the receiving contact face 206 rotates with the rotor, as the receiving contact face 206 is rigidly attached to the main shaft. When the rotor 203 does not rotate, the receiving contact face also does not rotate, thereby enabling a change from the disconnected mode to the connected mode of the switch 206, 207.

The contact faces 206, 207 are movable relative to each other in a contact switching direction, whereby the faces can be brought into or out of contact with each other. In the illustrated embodiment, only the delivering contact face 207 is movable in the contact switching direction. This is achieved by attaching the receiving contact face 206 rigidly to the main shaft and by attaching the delivering contact face 207 movably to the nacelle. The contact switching direction is radially outwardly from the axis of rotation, as the contact faces 206, 207 are brought into and out of contact with each other by moving the delivering contact face 207 radially from the axis of rotation.

The delivering contact face 207 is moved by a linear actuator (not shown).

Power is delivered to the hub 204 for e.g. de-icing of the at least one blade, for heating of the hub, for lighting in the hub, for maintenance needs, etc. via the cable 213.

The invention claimed is:

1. A wind turbine comprising:
a nacelle,
a rotor comprising at least one blade attached to a hub, the rotor being rotatably connected to the nacelle about an axis of rotation, and
an electrical supply structure for supplying electrical power from the nacelle to the rotor,
a control unit responsible for stopping rotation of the rotor at a predetermined position, the control unit controlling braking of the rotor based on at least a position of a switch relative to the predetermined position of the rotor,
wherein the electrical supply structure comprises the switch having a connected mode in which the nacelle and the rotor are electrically connected, and a disconnected mode in which the nacelle and the rotor are electrically disconnected,
wherein the switch comprises a delivering contact face operatively coupled to the nacelle and a receiving contact face following the rotation of the rotor such that the delivering contact face and the receiving contact face rotate relative to each other, and wherein the switch is adapted to change from the disconnected mode to the connected mode when the rotor does not rotate.

2. The wind turbine according to claim 1, wherein the receiving contact face defines an annular sector around the axis of rotation.

3. The wind turbine according to claim 1, adapted to detect a need for electrical power in the rotor and to change from the disconnected mode to the connected mode based on the detected need.

4. The wind turbine according to claim 3, further comprising a de-icing structure needing electrical power when de-icing the at least one blade.

5. The wind turbine according to claim 1, wherein the contact faces are movable relative to each other in a contact switching direction, whereby the contact faces are brought into or out of contact.

6. The wind turbine according to claim 5, wherein the contact switching direction is radially outwardly from the axis of rotation.

7. The wind turbine according to claim 5, wherein the contact switching direction is axially along the axis of rotation.

8. The wind turbine according to claim 5, wherein at least one of the contact faces is movable in the contact switching direction by a power driven actuator or a spring.

9. The wind turbine according to claim 1, wherein at least one of the contact faces is a ring face forming a ring shaped element extending circumferentially about the axis of rotation.

10. The wind turbine according to claim 9, wherein the ring face faces radially outwardly from the axis of rotation.

11. The wind turbine according to claim 9, wherein the ring face faces axially along the axis of rotation.

12. The wind turbine according to claim 1, wherein at least one of the contact faces forms at least one section of a circle about the axis of rotation.

13. The wind turbine according to claim 1, wherein at least one of the contact faces forms a track for the other contact face to facilitate guided relative movement.

14. The wind turbine according to claim 1, wherein the contact faces form matching surface imprints.

15. The wind turbine according to claim 1, wherein the delivering contact face is a different size than the receiving contact face.

16. The wind turbine according to claim 1, wherein the electrical supply structure is adapted for supply of power in the range of 10-200 kW.

17. The wind turbine according to claim 1, wherein the switch is adapted to change from the connected mode to the disconnected mode based on detection of a predetermined rotational speed of the rotor.

18. The wind turbine according to claim 1, wherein the delivering contact face, operatively coupled to the nacelle, includes at least three teeth and the receiving contact face includes a plurality of tracks such that the at least three teeth and the plurality of tracks rotate relative to each other.

19. The wind turbine according to claim 1, wherein the electrical supply structure comprises at least one additional switch, the at least one additional switch having an additional connected mode in which the nacelle and the rotor are electrically connected and an additional disconnected mode in which the nacelle and the rotor are electrically disconnected, wherein the at least one additional switch comprises a delivering contact face operatively coupled to the nacelle and a receiving contact face following the rotation of the rotor such that each delivering contact face of the at least one additional switch and each receiving contact face of the at least one additional switch rotate relative to each other, and wherein the at least one additional switch is adapted to change from the additional disconnected mode to the additional connected mode when the rotor does not rotate.

20. The wind turbine according to claim 19, wherein the number of switches equals the number of wind turbine blades.

\* \* \* \* \*